United States Patent

[11] 3,592,061

| [72] | Inventors | Ronald P. Schwedland<br>Indianapolis;<br>Morris F. Hall, Danville, both of, Ind. |
|---|---|---|
| [21] | Appl. No. | 852,434 |
| [22] | Filed | Aug. 22, 1969 |
| [45] | Patented | July 13, 1971 |
| [73] | Assignee | General Motors Corporation<br>Detroit, Mich. |

[54] GAS TURBINE AIRFOIL HAVING INTEGRAL THERMOCOUPLE
6 Claims, 6 Drawing Figs.

| [52] | U.S. Cl. | 73/343 R,<br>136/233 |
|---|---|---|
| [51] | Int. Cl. | G01k 1/14,<br>G01k 7/04 |
| [50] | Field of Search | 73/343,<br>359, 341, 346; 136/230, 232, 233 |

[56] References Cited
UNITED STATES PATENTS

| 3,232,794 | 2/1966 | Korton | 136/233 |
|---|---|---|---|
| 3,067,577 | 12/1962 | Dew | 73/359 UX |
| 3,509,768 | 5/1970 | Reynolds | 73/346 X |

*Primary Examiner*—Louis R. Prince
*Assistant Examiner*—Denis E. Corr
*Attorneys*—William S. Pettigrew and Peter P. Kozak ABSTRACT: A gas turbine airfoil having a thermocouple assembly mounted integrally therewith so as to sense the temperature at the surface of the leading edge of the airfoil without disturbing the gas flow conditions within the engine is disclosed.

PATENTED JUL 13 1971  3,592,061

INVENTORS
Ronald P. Schwedland, &
BY Morris F. Hall

Peter P. Kozak
ATTORNEY

GAS TURBINE AIRFOIL HAVING INTEGRAL THERMOCOUPLE

The invention herein described was made in the course of work under a contract or subcontract thereunder with the United States Air Force.

This invention relates to gas-contacting blades for use in gas turbine engines and the like. The gas-contacting blades can be either of the moving type, known as rotor blades, or of the stationary type, known as stator vanes. More specifically, it relates to a gas-contacting blade having an improved closed-tip thermocouple having a reliable long-life thermoelectric junction mounted in the airfoil portion of the blade forming an integral part thereof so as to sense the temperature at the surface of the airfoil portion without disturbing flow conditions within the engine.

In the past, closed-tip thermocouples used for gas turbine engine instrumentation have exhibited a tendency to fail prematurely resulting in termination of important tests with insufficient data retrieval. Investigations of these failures have shown either a broken thermocouple wire or an open junction at the working end of the thermocouple. The causes for these failures have been linked to improper welding techniques during closing of the tip which resulted in either a poor welded junction or the creation of a brittle junction due to alloying of the thermocouple wires. As a result, the welded junction either lacked the mechanical strength necessary for operation or the thermocouple wires became brittle producing an unreliable junction. The severity of this problem increases in thermocouple with thin gauge wire in that these wires are easily broken when subjected to the mechanical vibration of a gas turbine engine during operation.

In addition to improving the reliability of closed-tip thermocouples for use in gas turbine engine instrumentation, it is also highly desirable to mount the thermocouple in the turbine so as to retrieve reliable data at the most critical areas of the turbine. That is, in the past the thermocouples have either been mounted as projections within the turbine engine which caused a disturbance in the flow conditions within the turbine or the thermocouples have been mounted entirely within a contacting blade, and therefore, were able to give accurate information only as to the overall temperature of the blade. They were unable to give a precise measurement of the skin or surface temperature of the airfoil portion, particularly at the leading edge, which is a limiting parameter on gas turbine engine operation temperature. Therefore, it is highly desirable to have a gas turbine blade with a reliable long-life thermocouple mounted in the leading edge of the airfoil portion of the blade, and having a working or sensing surface at the surface of the leading edge of the airfoil. It should be noted that when sensing surface temperatures in gas turbine engines, it is necessary that the thermocouple form an integral part of the blade and that the working surface of the thermocouple be of the same contour and integral with the airfoil surface for in oxidation and erosion environments as occur in gas turbine engines even a slight discontinuity between the surfaces can cause crack initiation and catastrophic failure of the blade.

Accordingly, it is a principle object of this invention to provide a gas-contacting blade having a reliable long-life closed-tip thermocouple mounted integrally therewith so as to sense the temperature of the airfoil skin without disturbing flow conditions within the turbine engine.

Another object of this invention is to provide a method of making the improved closed-tip thermocouple.

A further object of this invention is to provide a method for mounting the thermocouple in the airfoil portion in integral relationship therewith without surface discontinuities which disturb flow conditions and which may cause catastrophic failure of the blade.

These and other objects are accomplished by providing a thermocouple assembly in which a pair of thermocouple wires are enclosed in a metallic sheath together with an electrically insulating refractory material which spaces the wires away from the sheath and provides mechanical support for the wires within the sheath, fusing one end of the sheath closed around the thermocouple wires thereby forming a reliable fusion junction between the wires forming the thermoelectric junction, mechanically forming the fused thermoelectric junction to a given configuration corresponding to the configuration of a hole in the airfoil surface, and then mounting the formed end in the airfoil hole so as to form an integral part of the airfoil wherein the working surface of the thermocouple assembly is integral with and of the same contour as the surface of the airfoil so that the temperature of the airfoil skin can be sensed without disturbing the flow conditions within the gas turbine engine.

Other objects and advantages will be apparent from the following description of the invention, reference being had to the accompanying drawings in which.

This invention has particular application to miniaturized thermocouples capable of accurately measuring temperatures up to 2300° F. for installation in the leading edge of the airfoil portion of either rotor blades or stator vanes. By way of example and for purposes of the following description of the invention, one type of thermocouple in which this invention has been successfully embodied will be discussed. The thermocouple assembly comprises a metal alloy sheath having an outside diameter of from 0.030 to 0.040 inch and a pair of Chromel-Alumel thermocouple wires of 0.005 inch diameter enclosed therein, together with a suitable electrically insulating refractory material such as magnesium oxide to space the wires apart and away from the sheath and to provide mechanical support for the wires within the sheath. This invention is directed to an integral relationship between the thermocouple assembly and the airfoil portion of the blade. Therefore, it is highly desirable to have the thermocouple sheath formed of similar alloy material as that of the blade. The following table I contains examples of high temperature, corrosion resistant nickel-base alloys commonly used in turbine blades. Table II contains examples of alloys used as sheath material of thermocouple assemblies which have been successfully joined to the airfoil portions of blades made of materials listed in Table I. In tables I and II, the weight percent of each alloying constituent is listed in vertical columns for each of the example alloys.

TABLE I

| Carbon | 0.12 | .05–.15 | 0.08–0.20 | 0.13–0.17 |
|---|---|---|---|---|
| Manganese | | [1]1.0 | [1]0.25 | [1]0.20 |
| Chromium | 19.0 | 20.5–23.0 | 13.0–15.0 | 8.0–10.0 |
| Molybdenum | 9.75 | 8.0–10.0 | 3.8–5.2 | 2.25–2.75 |
| Tungsten | | 0.20–1.0 | | 9.0–11.0 |
| Iron | | 17.0–20.0 | [1]2.5 | [1]1.0 |
| Titanium | 3.2 | | 0.5–1.25 | 1.25–1.75 |
| Aluminum | 1.5 | | 5.5–6.5 | 5.25–5.75 |
| Silicon | | [1]1.0 | [1]0.50 | [1]0.20 |
| Sulfur | | [1].03 | [1]0.015 | [1]0.015 |
| Copper | | | | [1]0.10 |
| Tantalum | | | 1.8–2.8 | 1.25–1.75 |
| Boron | .006 | | .005–0.015 | 0.010–0.020 |
| Zirconium | | | | 0.030–0.08 |
| Cobalt | 11.0 | .50–2.50 | [1]1.0 | 9.0–11.0 |
| Nickel | Remainder | Remainder | Remainder | Remainder |

[1] Maximum.

TABLE II

| | | | |
|---|---|---|---|
| Carbon | 0.12 | [1] 0.08 | [1] 0.15 |
| Manganese | | 1.0 | [1] 1.0 |
| Chromium | 19.0 | 14.0-17.0 | 12.0-15.0 |
| Molybdenum | 9.75 | | |
| Tungsten | | | |
| Iron | | 5.0-9.0 | [1] 9.0 |
| Titanium | 3.2 | | |
| Aluminum | 1.5 | 0.4-1.0 | |
| Silicon | | [1] 0.5 | [1] 0.5 |
| Sulfur | | | [1] 0.2 |
| Copper | | [1] 0.5 | [1] 0.5 |
| Tantalum | | 0.7-1.2 | |
| Boron | .006 | | |
| Zirconium | | | |
| Cobalt | 11.0 [1] | [2] 70.0 | [2] 75.0 |
| Nickel | Remainder | | |

[1] Maximum.
[2] Minimum.

Figure 1:
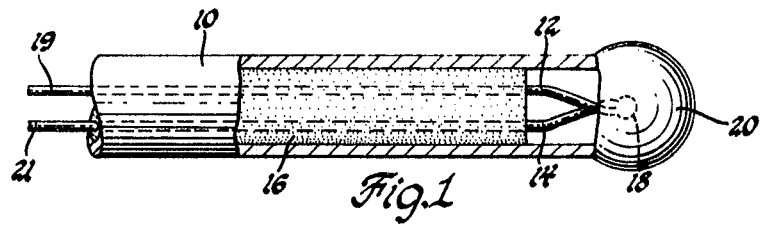
FIG. 1 is a schematic representation with sections removed of an improved thermocouple assembly as embodied by this invention prior to forming for mounting in the airfoil portion of a gas contacting blade.

Referring to FIG. 1, there is shown a schematic representation of an improved closed-tip thermocouple assembly as embodied by this invention, comprising a metallic sheath 10 made, for example, from any of the alloys previously listed in table II in the form of a hollow cylinder of suitable length. Within the sheath are a pair of Chromel-Alumel thermocouple wires 12, 14 which are spaced apart and away from the sheath by means of any suitable electrically insulating, refractory material 16 such as magnesium oxide powder or its equivalent. The closed-tip thermocouple assembly is formed by removing the refractory oxide 16 from within the sheath 10 a desired distance from one end of the thermocouple assembly so as to expose a suitable length of the thermocouple wires 12, 14. The exposed wires are then twisted together to form a sensing element 18 (shown in dotted lines) and the end of the sheath 10 is crimped or swaged around the sensing element 18. Following this step the thermocouple assembly is then placed in a weld fixture with the crimped end projecting upward toward a tungsten inert gas welding apparatus having a 0.020 tungsten wire electrode. Power is supplied to the welding apparatus and the crimped end of the thermocouple sheath 10 is melted into a weld ball 20. During the fusing operation, both the sheath 10 and the projecting sensing element 18 fuse together to form the weld ball 20 which seals the end of the thermocouple assembly and forms a fused, closed end junction which constitutes the thermoelectric junction end of the thermocouple assembly. Tests, as will be fully described later, have shown that this type of fused junction is highly reliable under gas turbine operation conditions. The respective opposite ends of the wires extend to the other end of the sheath through the enclosed refractory material forming terminal leads 19, 21. Since it is known that the inclusion of gases, moistures, and other impurities in the weld contribute a poor welded junction, during the forming procedure, precautions are taken to degas or remove all entrapped gases or moisture from within the ceramic material 16 and to remove all of the surface impurities such as organic materials and absorbed gases that were picked up during forming of the sheath and wires in order to ensure a reliable weld junction.

Figure 2:
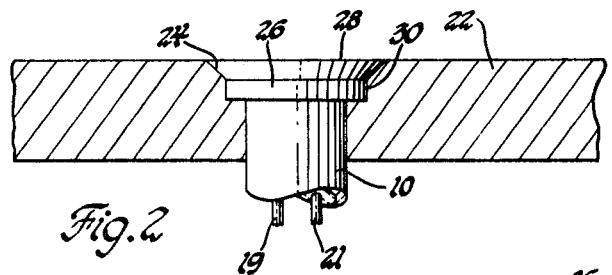
FIG. 2 is a schematic representation of a process for forming the end of the thermocouple assembly of FIG. 1.

Following the fusing procedure, the thermocouple assembly is then placed in a die forming fixture 22 with the fusion junction seated in a die 24 formed complementary to the surface desired to be formed, and the junction is then mechanically formed to the desired configuration 26, as shown in FIG. 2. As a result, there is formed a thermocouple assembly terminating in a closed, formed end constituting a fused thermoelectric junction having a working end 28. In the preferred embodiment, the thermocouple assembly end 26 is formed with a flat working end 28 and an annular projection 30 below the working end which will hereinafter be more fully described. However, depending on the procedure used in mounting the thermocouple assembly in the airfoil, the projection 30 can be eliminated and the working end 28 can be formed in conformity to the contour of the surface of the airfoil in which the thermocouple assembly is to be mounted. Following the forming operation the working end 28 is then machined so that the sensing junction 18 is within 0.015 inch of the surface 28.

Figure 3:
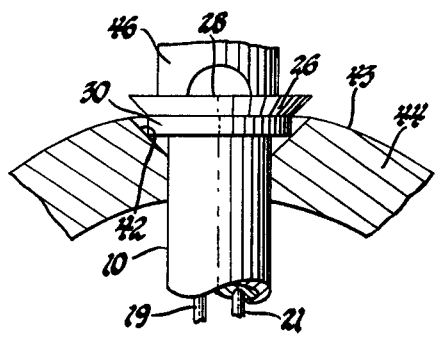
FIG. 3 is a schematic representation of a mounting process.
Figure 5:
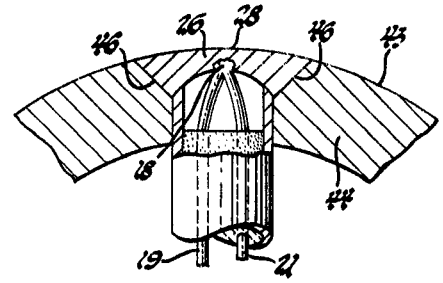
FIG. 5 is an enlarged portion of FIG. 4 showing the mounted thermocouple assembly and showing the proximity of the thermoelectric junction to the airfoil surface.
Figure 4:
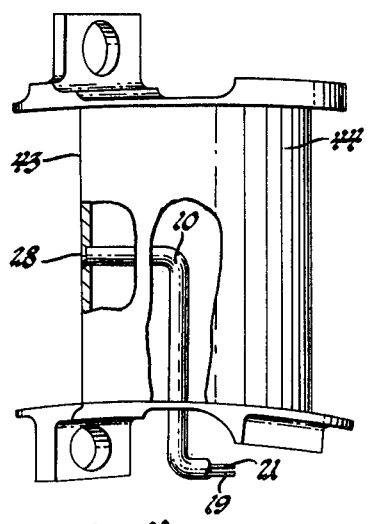
FIG. 4 is a schematic representation of the thermocouple assembly when mounted in the airfoil portion of a gas-contacting blade.

Referring now to FIG. 3, the formed, closed-tip thermocouple assembly is then placed in a countersunk hole 42 in the leading edge 43 of the turbine airfoil 44 (shown as an enlarged section) with the formed annular projection 30 contacting the surface of the hole 42 below the surface of the airfoil 44. A resistance welding tip 46 is placed on the working end 28 of the formed end 26 and the formed end is then resistance welded into the turbine airfoil 44 to form a turbine airfoil 44 having the closed end thermocouple assembly 10 mounted integrally therewith, as shown in FIGS. 4 and 5. As further shown in FIG. 5, it will be noted that the area of fusion 47 between the formed end 26 of the thermocouple assembly 10 and the turbine airfoil 44 is at the projection 30 and, therefore, is below the surface of the airfoil 44. Since it is known that the area of fusion has a greater propensity to be attacked by the corrosive and erosive environment than does either the airfoil surface or the working end 28 of the thermocouple assembly, the area fusion is placed below the surface by this technique and, thereby, not exposed to the environment being sensed thus ensuring minimum degradation of the blade life due to instrumentation. Furthermore, during the resistance welding procedure the working end 28 of the thermocouple assembly is formed in conformity to the contour of the surface of the airfoil and, as a result, the working end 28 forms a portion of the surface of the airfoil 44 with no discontinuities between the thermocouple assembly and the airfoil surface which would lead to crack initiation and catastrophic failure of the blade. Another important feature of the resistance welding technique as herein described, lies in mounting the thermocouple assemblies in blades made of Thoria Dispersion strengthened alloys. That is, welding of Thoria Dispersion alloys causes agglomeration of the thoria due to melting, thus vastly reducing the strength and oxidation-erosion life of the alloy. However, when the projection resistance welding technique is used, melting is limited to a small region under the airfoil surface placing the melted region out of contact with the environment, and thereby, again ensuring minimum degradation of the blade life due to instrumentation.

Figure 6:
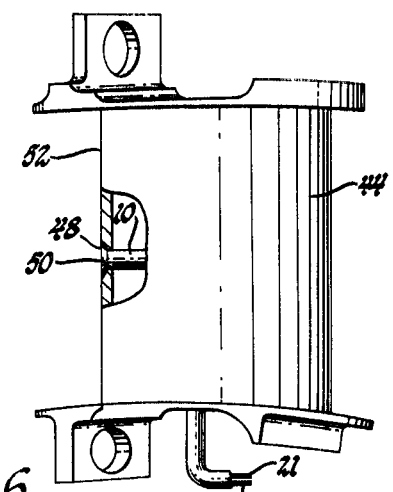
FIG. 6 is a schematic representation of an alternate method of mounting the thermocouple assembly in the airfoil portion of the blade as embodied by this invention.

Further investigations have shown Laser welding to be an excellent method for mounting the thermocouple assembly in airfoil blades other than those made of Thoria Dispersion strengthened alloys. In this case, the fusion junction is die formed into a conical shape with the working end being formed in conformity to the contour of the surface of the airfoil in which it is to be mounted. The formed, closed thermocouple assembly end is then placed in a corresponding conical hole in the airfoil with the surface of the airfoil and the working end of the thermocouple assembly being integral and a very fine overlapping Laser weld on the order of 0.015-0.020 inch diameter spots is made around the edge of the working end of the thermocouple assembly. Although, the Laser welding technique exposes the weld 48 to the environment, its size is restricted and it ensures that no discontinuities exist between the working end 50 and the airfoil surface 52, as shown in FIG. 6. It will be noted that in FIG. 6 the weld 48 has been exaggerated for the sake of clarity.

As stated earlier the respective opposite ends of the wire extend to the other end of the sheath forming terminal leads 19, 21. When the thermocouple assembly is mounted in a rotor blade the leads extend through the center of the blade, through the hub to which blade is attached, and then inside along the shaft to which the hub is attached. At a suitable position along the shaft the leads are coupled to a slipring arrangement which is coupled to a potentiometer. This arrangement allows the temperature at the surface of the airfoil portion of the blade to be measured while the engine is in operation and the rotor blade is in motion. When the thermocouple assembly is mounted to a stator vane the leads extend through the center of the vane and then directly out through the engine wall to a potentiometer.

In order to demonstrate the reliability and life of a thermocouple assembly made and mounted in the leading edge of a turbine airfoil by the process embodied by this invention, both visual and life tests were made. Visual examination at 30X magnification showed that when the thermocouple assemblies were properly mounted as herein taught, excellent joint fitup was achieved with no discontinuities on the surface of the airfoil. The life test was conducted by mounting 134 thermocouple assemblies into turbine airfoils and then subjecting the airfoils to engine testing. Several other specimens were subjected to a severe cyclic thermal shock test which consisted generally of rapid heating to 1,800° F and rapid cooling to 600° F for 100 cycles. Other specimens installed in TD NiCr material were cycled from 2,350° F to 200° F. for 50 cycles. These tests purposely exceeded engine metal temperature to accelerate any possible junction failures and was not intended for testing the blade or vane materials as the heated zone was restricted to a very small area on the blade or vane leading edge. At the end of the 100 cycles, all of the thermocouple assemblies cycled to 1,800° F. were operating perfectly and showed no breaks in either the thermocouple wires or between the fusion junction and the wires. Moreover, all of the thermocouple assemblies maintained continuity with the airfoils and withstood the 100 cycle requirement. It is apparent then that the process as herein described offers an improved closed-tip thermocouple assembly of high reliability and long life which can be mounted integrally with the leading edge of a turbine airfoil so as to sense the skin temperature of the airfoil with a minimum degradation of blade life due to instrumentation.

Although the invention has been described in terms of a specific embodiment, it will be understood that various modifications may be made within the scope of the invention.

We claim:

1. A gas turbine engine component comprising, in combination,
   an airfoil portion having an opening in the surface thereof, and
   a thermocouple assembly including a metallic sheath and a pair of spaced thermocouple wires located in said sheath joined at one end to form a temperature sensing junction, said sheath having a fusion closed working end terminating in a working surface with said temperature sensing junction being embedded and fused in said end and being in close proximity to said working surface, said thermocouple assembly being mounted in and filling said opening with said working surface forming a portion of said airfoil surface and having the same contour as said surface whereby said thermocouple assembly is operative to sense the temperature of said surface of said airfoil without disturbing the gas flow conditions in said engine.

2. A gas turbine engine component comprising in combination,
   a metallic airfoil portion having an opening in the surface thereof, and
   a thermocouple assembly including a metallic sheath and a pair of spaced thermocouple wires located in said sheath joined at one end to form a temperature sensing junction, said sheath having a fusion closed working end terminating in a working surface with said temperature sensing junction being embedded and fused in said end and being in close proximity to said working surface, said thermocouple assembly filling said opening and being welded to said airfoil portion with said working surface forming a portion of said airfoil surface and having the same contour as said surface whereby said thermocouple assembly is operative to sense the temperature of said surface of said airfoil without disturbing the gas flow conditions in said engine.

3. Claim 2 wherein said temperature sensing junction is within 0.015 inch of said working surface.

4. A gas turbine engine component comprising in combination,
   an airfoil portion having a leading and trailing edge and having an opening in the surface of said leading edge, and
   a thermocouple assembly including a metallic sheath and a pair of spaced thermocouple wires located in said sheath joined at one end to form a temperature sensing junction, said sheath having a fusion closed working end terminating in a working surface with said temperature sensing junction being embedded and fused in said end and being in close proximity to said working surface, said thermocouple assembly being mounted in and filling said opening with said working surface forming a portion of said leading edge of said airfoil surface and having the same contour as said leading edge of said airfoil surface whereby said thermocouple assembly is operative to sense the temperature of the surface of said leading edge of said airfoil without disturbing the gas flow conditions in said engine.

5. Claim 4 wherein said component is a gas turbine rotor blade.

6. Claim 4 wherein said component is a gas turbine stator vane.

UNITED STATES PATENT OFFICE
CERTIFICATE OF CORRECTION

Patent No. 3,592,061                    Dated July 13, 1971

Inventor(s) Ronald P. Schwedland & Morris F. Hall

It is certified that error appears in the above-identified patent and that said Letters Patent are hereby corrected as shown below:

Column 3, Table II, the bottom two lines should read as follows:

| | | | |
|---|---|---|---|
| Cobalt | 11.0 | 2⎰ 70.0 | 2 ---- |
| Nickel | Remainder | ⎱ | 75.0 |

Signed and sealed this 15th day of February 1972.

(SEAL)
Attest:

EDWARD M. FLETCHER, JR.        ROBERT GOTTSCHALK
Attesting Officer               Commissioner of Patents